(12) United States Patent
Velasco

(10) Patent No.: US 9,230,542 B2
(45) Date of Patent: Jan. 5, 2016

(54) LANGUAGE-INDEPENDENT, NON-SEMANTIC SPEECH ANALYTICS

(71) Applicant: ZOOM INTERNATIONAL s.r.o., Prague (CZ)

(72) Inventor: Moses Velasco, Prague (CZ)

(73) Assignee: ZOOM INTERNATIONAL S.R.O., Prague (CZ)

( * ) Notice: Subject to any disclaimer, the term of this patent is extended or adjusted under 35 U.S.C. 154(b) by 0 days.

(21) Appl. No.: 14/231,740

(22) Filed: Apr. 1, 2014

(65) Prior Publication Data

US 2015/0279359 A1 Oct. 1, 2015

(51) Int. Cl.
*G10L 15/00* (2013.01)
*G10L 15/18* (2013.01)

(52) U.S. Cl.
CPC ...................................... *G10L 15/18* (2013.01)

(58) Field of Classification Search
CPC ......... G10L 17/26; G10L 15/08; G10L 15/22; G10L 2015/081; G10L 2015/085
USPC ......... 704/207, 246, 249, 251, 200, 205, 206, 704/270, 272, 278, 257; 715/763
See application file for complete search history.

(56) References Cited

U.S. PATENT DOCUMENTS

| | | | |
|---|---|---|---|
| 2010/0042935 A1* | 2/2010 | Malden et al. ................. | 715/763 |
| 2010/0235166 A1* | 9/2010 | Bardino et al. ............... | 704/207 |
| 2011/0035221 A1* | 2/2011 | Zhang et al. .................. | 704/246 |
| 2011/0307257 A1* | 12/2011 | Pereg et al. ................... | 704/251 |
| 2012/0089396 A1* | 4/2012 | Patel et al. .................... | 704/249 |
| 2014/0088965 A1* | 3/2014 | Goel ............................. | 704/246 |

* cited by examiner

*Primary Examiner* — Huyen Vo

(74) *Attorney, Agent, or Firm* — Galvin Patent Law; Brian R. Galvin

(57) ABSTRACT

A method for language-independent, non-semantic speech analytics that may analyze spoken utterances without regard for the language or speakers, comprising the steps of receiving an audio input containing human speech, analyzing the audio to identify the waveform pattern, and analyzing the waveform to identify periods of silence, and additional methods for alternative non-speech-based speech analysis, and a system for non-speech-based analysis comprising a media server that receives audio input, an analytics server that processes the audio input, and a management server that configures operation of the analytics server.

3 Claims, 10 Drawing Sheets

LANGUAGE-INDEPENDENT, NON-SEMANTIC SPEECH ANALYTICS

CROSS-REFERENCE TO RELATED APPLICATIONS

None.

BACKGROUND OF THE INVENTION

1. Field of the Art

The disclosure relates to the field of speech analytics, and more particularly to the field of analyzing speech patterns using language-independent, non-semantic speech analytics.

2. Discussion of the State of the Art

In the field of speech analytics, much progress has been made in recognizing and processing natural spoken language effectively. However, current approaches focus on language-specific analytics, such as processing for words, phrases, or phonemes that are tied to a particular world language.

There are some efforts to monitor or interpret speech patterns without regard for the content being spoken (thus, a language-independent approach), but the current methods focus on speech analysis only insofar as monitoring simple metrics such as speech rate of a telephone call participant, or comparing a speaker's voice patterns when calm against patterns when emotional, such as to determine when they are in an emotional state (such as for truth detection, for example). These approaches offer only a simplistic approach to speech analytics, measuring a single metric or focusing on a specific speaker or use case rather than answering a broader need for language-independent speech analytics in general.

What is needed is a means to analyze speech using means that are not tied to any specific language, instead focusing on non-semantic elements of spoken language, and that may be applied broadly to existing or novel speech analysis systems or hardware and in various use cases as needed.

SUMMARY OF THE INVENTION

Accordingly, the inventor has conceived and reduced to practice, in a preferred embodiment of the invention, various methods for language-independent, non-semantic speech analytics that are both use- and language-independent and may utilize existing or novel speech analysis systems as necessary.

According to a preferred embodiment of the invention, a system for language-independent, non-semantic speech analytics, comprising a media server stored and operating on a network-connected computing device; a database stored and operating on a network-connected computing device, that stores the audio input for future reference; an analytics server stored and operating on a network-connected computing device; and a management server stored and operating on a network-connected computing device, is disclosed. The media server receives audio input from a plurality of network-connected devices and stores raw audio in the database; the management server configures operation of the analytics server based at least in part on manual input from a human user; the analytics server performs processing operations on the audio input; and the database stores the results of the processing operations. The processing operations comprise at least: analyzing, via an analytics server stored and operating on a network connected device, the audio input to identify an audio waveform; analyzing the waveform to determine a plurality of periods of silence; analyzing the waveform to identify a plurality of spoken syllables; analyzing the spoken syllables to determine speech characteristics, including at least a pace of speech during an interaction and a change in pace of speech during an interaction; analyzing the waveform to determine a plurality of periods of cross-talk wherein two or more interaction participants are speaking simultaneously; and analyzing the waveform to determine an emotional state of a speaker.

According to another preferred embodiment of the invention, a method for language-independent, non-semantic speech analytics comprising the steps of receiving an audio signal (such as a call recording or other audio input), processing the audio for amplitude ("peaks" in an audio waveform, indicating the presence of an utterance or other noise), performing silence detection to identify gaps or periods of low amplitude (as might indicate pauses in speech), and returning results of silence detection (such as presenting to a user, or storing for future review). It should be appreciated that an audio source may be any appropriate source of audio data such as a live audio stream or stored audio file or recording, and may comprise one or more speakers as well as other audio sources such as background noise or other nonverbal audio, and it should be further appreciated by one having skill in the art that with current audio processing technologies common in the art, it is easy to isolate human speech from background noise, as well as to separate speakers when multiple individuals are present in an audio recording.

According to a further embodiment of the invention, a method for language-independent, non-semantic speech analytics may comprise alternative steps (as opposed to those presented above in a preferred embodiment) of processing an audio input and identifying spoken syllables (or other basic units of speech), and returning the results of syllable identification (as opposed to silence detection as described previously). According to the embodiment, syllable detection may be utilized to identify speech patterns such as cadence or rhythm, rather than attempting to extract actual linguistic meaning by recognizing the meaning of the syllables themselves. In this manner, speech analysis may reveal speech patterns regardless of the language being spoken or the speaker being heard, by utilizing discrete verbal units (such as syllables) as a basis for analysis.

According to a further embodiment of the invention, a method for language-independent, non-semantic speech analytics may comprise additional steps of utilizing syllable identification to analyze speech cadence or rhythm, such as to identify rushed, hesitant, or otherwise unusually-paced speech, regardless of the content of that speech. In this manner, analysis may be seen to build upon itself—that is, successive stages of analysis may reveal additional information by utilizing the results of previous stages, such as (according to the embodiment) utilizing syllable detection as a basis for speech cadence recognition. Again, as described above such analysis may be performed and provide useful results regardless of the language being spoken or the content of the speech itself, enabling meaningful analysis even if a speaker or language is not known (for example, speech analysis could be performed on recordings of unknown or even fictional spoken language and still yield useful results by analyzing various described properties or components of the speech without regard for its content).

According to a further embodiment, a method for language-independent, non-semantic speech analytics may comprise alternative steps of identifying individual speakers within an audio input, and analyzing the "crosstalk", or occurrence of multiple speakers speaking simultaneously, or "talking over each other". In this manner speech analysis may identify events such as an argument, where multiple speakers may be trying to speak simultaneously, or individual speaker characteristics such as impatience, for example by determining that a particular speaker has an unusually high tendency to speak while another speaker is already speaking, for example. Again, this analysis may be performed without regard for the content of the speech, and may reveal such patterns and other results regardless of the language being spoken, who the speakers are, or the content of their speech.

According to a further embodiment, a method for language-independent, non-semantic speech analytics may comprise additional steps of utilizing crosstalk analysis (as described above) and determining a "talk ratio", representing each speaker's relative role in a conversation by determining how much of a conversation each speaker contributed, how much of a conversation was crosstalk, or other such relationships. Such analysis might reveal further detail into a conversation without regard for the content of the speech itself, such as revealing whether a particular speaker might have been giving a presentation or lecture (where one speaker might dominate a conversation by a large margin, with several other speakers contributing little), or relationships between individual speakers (such as indicating that whenever a particular speaker says something, another speaker usually follows, as might indicate a personal or professional relationship between the two).

It should be appreciated that as described above, such analytic techniques may be performed without regard for the content of speech or the identities of speakers involved, instead relying on the structure of the speech itself. It therefore becomes possible to perform such analysis on speech that is otherwise unintelligible, such as an unknown or foreign language, a fictitious or obscured language (such as "code talk"), or a muffled, garbled, or otherwise unintelligible recording. It may therefore be appreciated that such analysis as described herein may yield useful results where other techniques fail, and also that such analysis does not require specialized equipment or linguistic knowledge to yield results as described.

In a further preferred embodiment of the invention, a system for non-speech-based speech analytics comprising a media server stored and operating on a network-connected device that may receive audio media such as voice recordings or live audio streams, an analytics server stored and operating on a network-connected device that may perform processing operations on media, a database that may store media and analysis results, and a management server stored and operating on a network-connected device that may configure or modify analysis operations as well as present analysis results to a user for viewing or interaction, is disclosed. According to the embodiment, a media server may receive audio as input from various media sources such as audio recording devices or stored audio information such as recordings stored on a database or a media player (for example). An analytics server may perform processing operations on audio such as those described above in the embodiments of the invention, for example to analyze audio according to the invention. A management server may configure or modify such analysis operations, such as by manual input from a human user, or automated or semi-automated operation such as by rules-based or machine learning operation. In this manner, it may be seen that operation of audio analysis may be performed with or without human interaction, interchangeably as appropriate. According to the embodiment, a management server may also present analysis operation results to a user for viewing or interaction, such as to rearrange or modify data, for example to perform manual "cleanup" to remove additional noise or unneeded audio elements after listening to an audio source.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary, and are not to be considered as limiting of the scope of the invention or the claims herein in any way.

DETAILED DESCRIPTION

Figure 1:
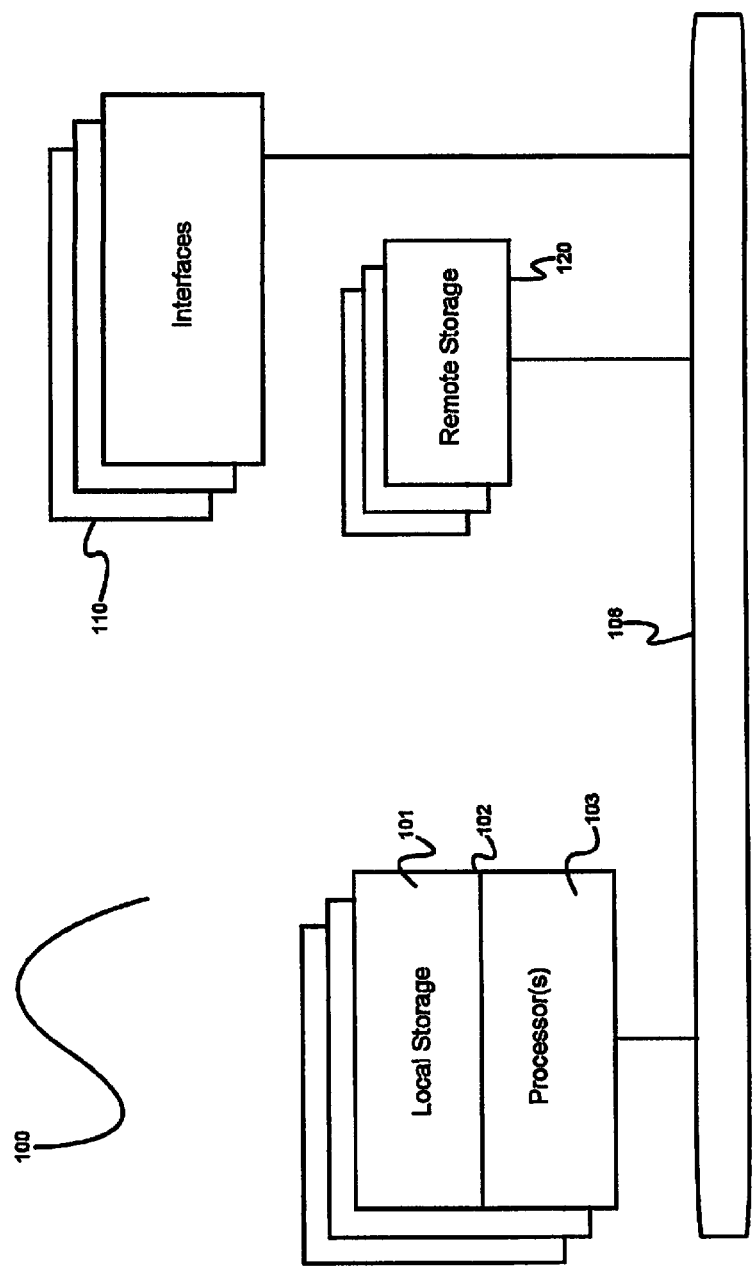
FIG. 1 is a block diagram illustrating an exemplary hardware architecture of a computing device used in an embodiment of the invention.

Accordingly, the inventor has conceived and reduced to practice, in a preferred embodiment of the invention, various methods for non-speech-based speech analytics that are both use- and language-independent and may utilize existing or novel speech analysis systems as necessary.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention (s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
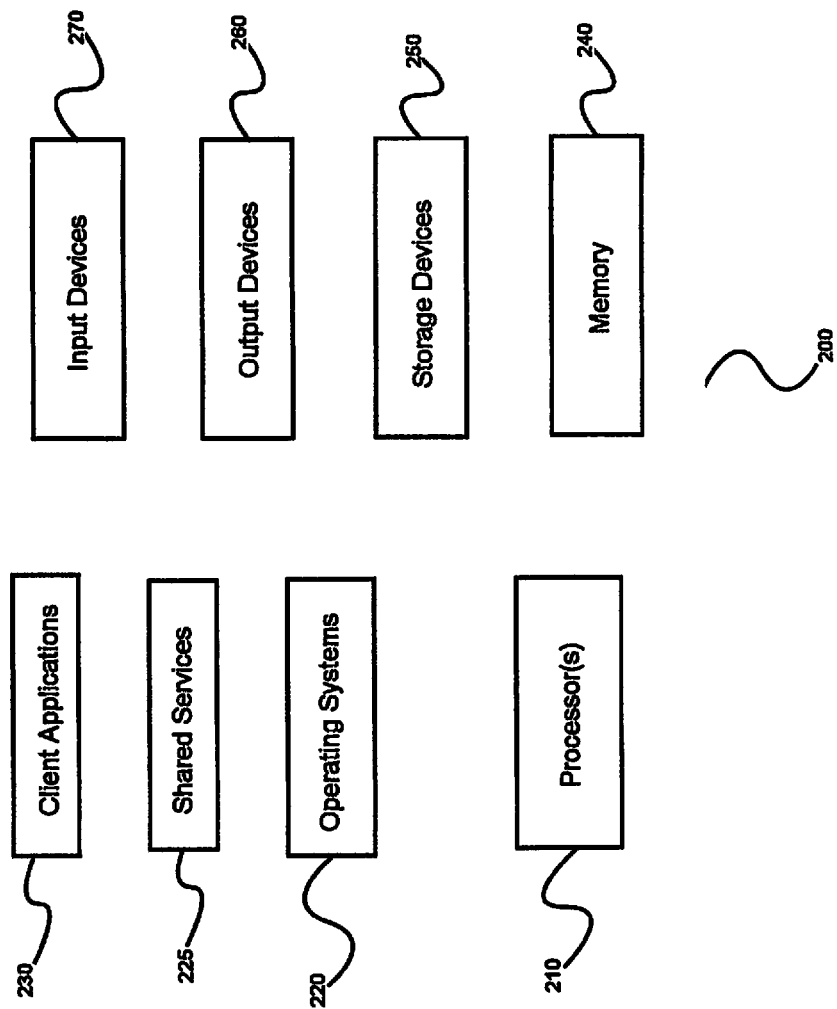
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
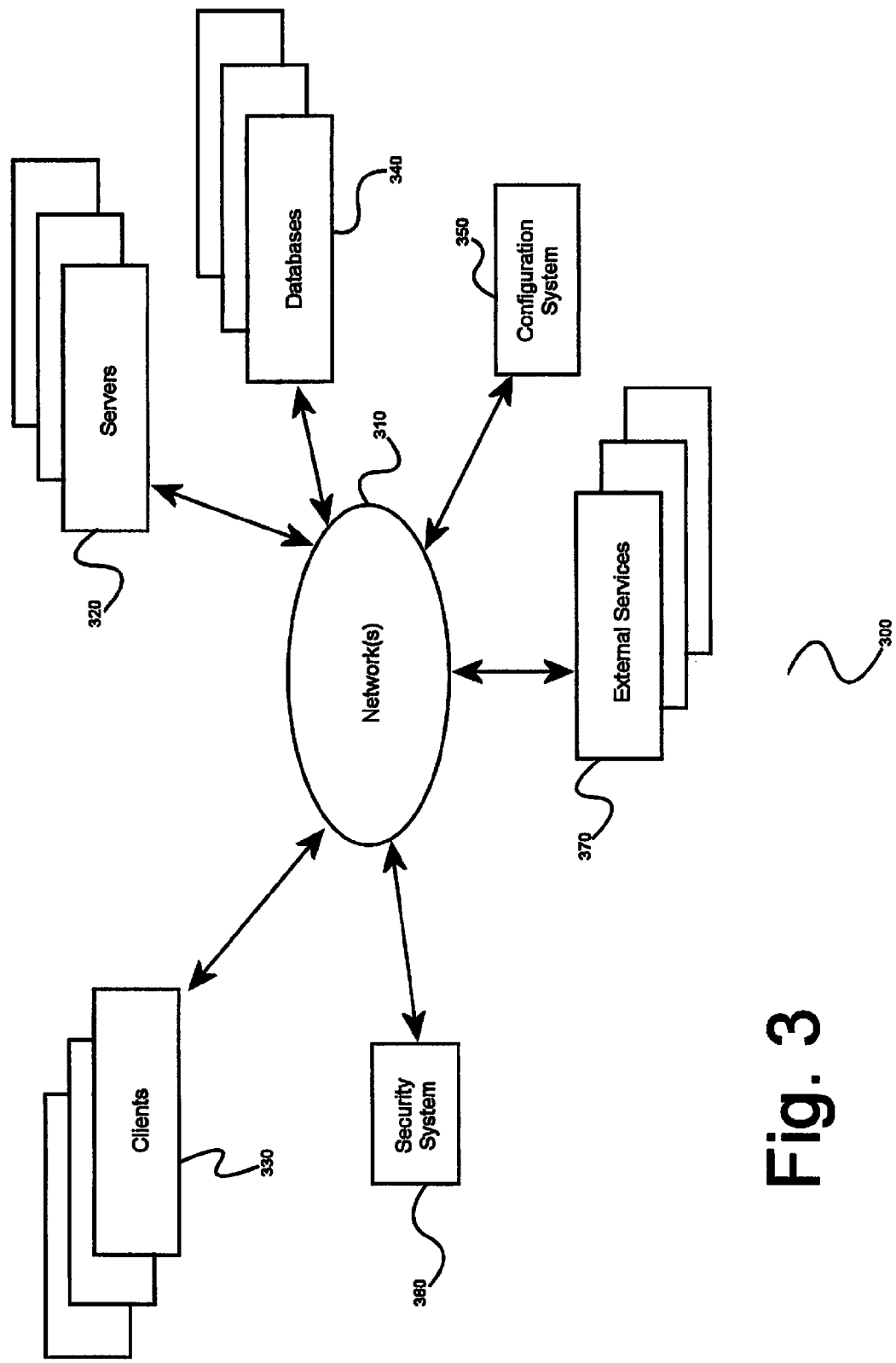
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
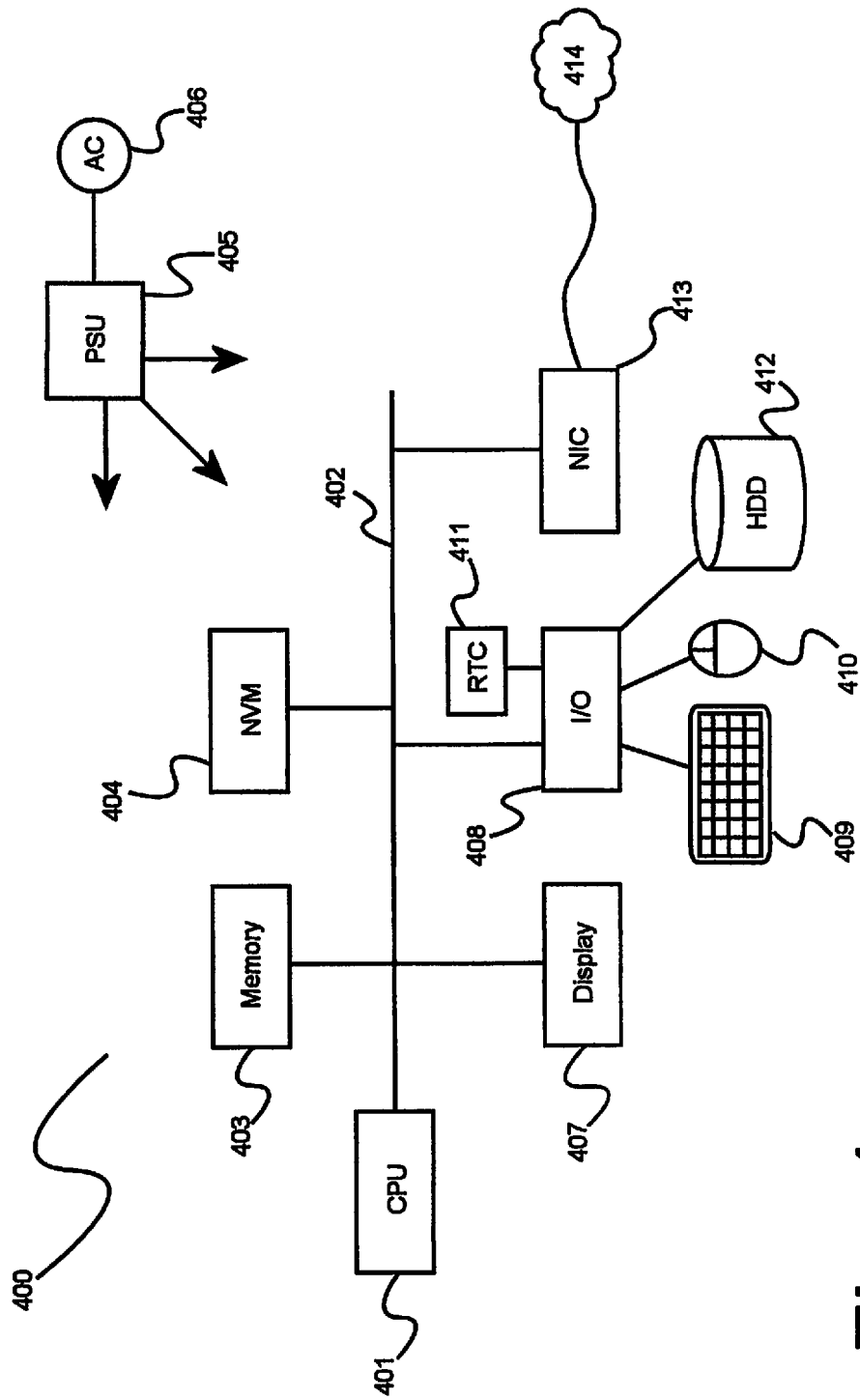
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Detailed Description of Exemplary Embodiments

Figure 10:
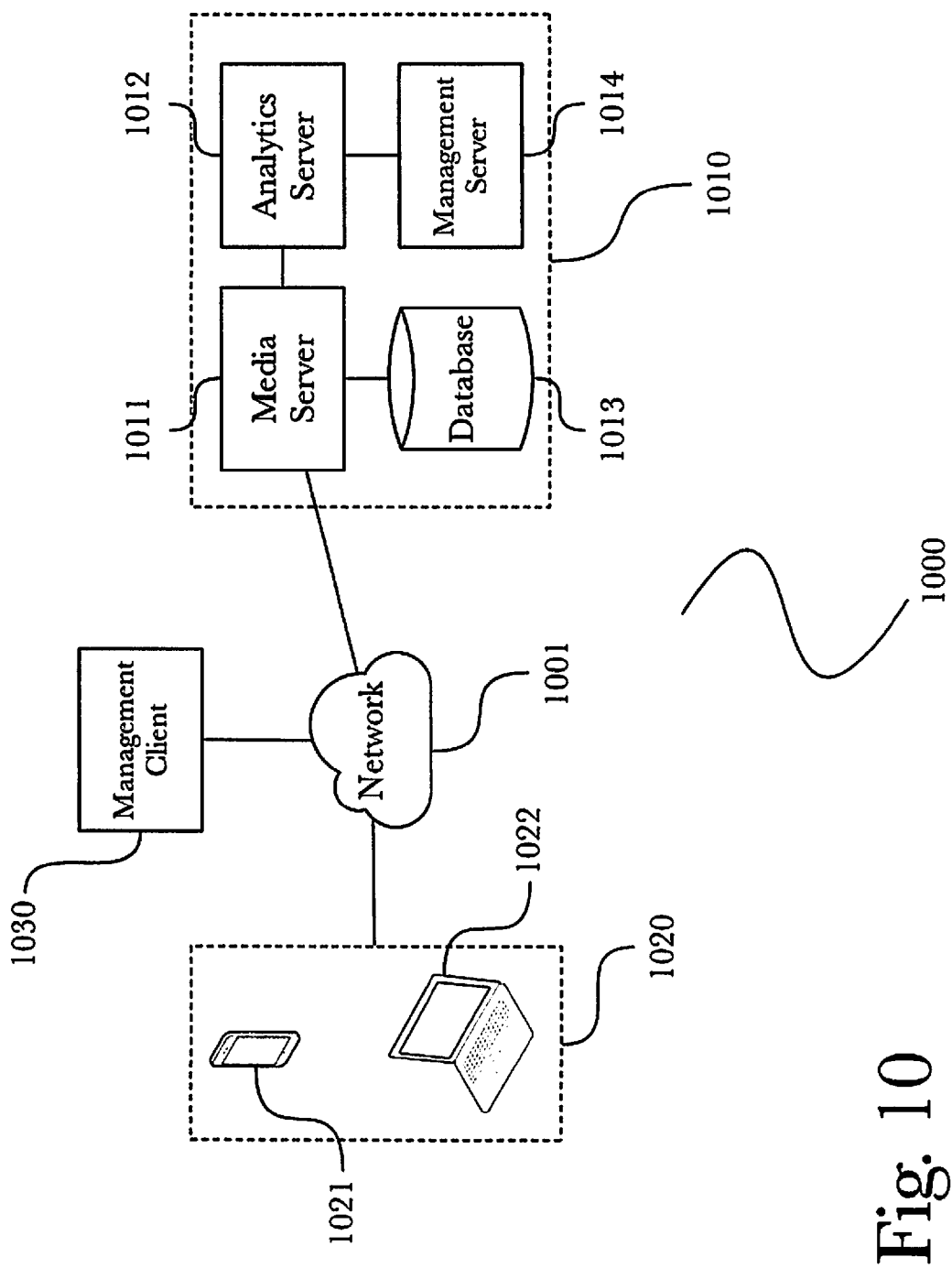
FIG. 10 is a block diagram illustrating an exemplary system architecture for language-independent, non-semantic speech analytics, according to a preferred embodiment of the invention.

FIG. 10 is a block diagram illustrating an exemplary system architecture 1000 for language-independent, non-semantic speech analytics, according to a preferred embodiment of the invention. As illustrated, media sources 1020 may communicate via the Internet 1001 or other appropriate communications network (such as, but not limited to, telephone or cellular data networks). Media (such as audio information, i.e. recorded or live streaming audio) from sources 1020 may be received by a speech analytics system 1010, such as by passive collection (for example, when a speech analytics system 1010 may be configured to automatically receive data from sources) or by actively requesting or retrieving media. In some embodiments, audio or speech data may be stored in database 1013 for later retrieval and analysis by analytics system 1010, and specific analytics server 1012.

According to the embodiment, a system for language-independent, non-semantic speech analytics 1010 may comprise a media server 1011 that may receive audio media such as voice recordings or live audio streams, and may make such media content available to other components of system 1010 such as an analytics server 1012 that may perform processing operations on media, a database 1013 that may store media and analysis results, or a management server 1014 that may configure or modify analysis operations and may interact with an interactive software component such as a management client user interface 1030 for direct user interaction, or an application programming interface (API) for indirect interaction through connected means such as a user's device or other software or hardware device or service, such as to present analysis results to a user for viewing or interaction. According to the embodiment, media server 1011 may receive audio as input from various media sources 1020 such as a landline or mobile phone 1021 or personal computer 1022 communicating via the Internet 1001 or other communications network, or stored audio information such as recordings stored in database 1013, for example. Analytics server 1012 performs processing operations on audio such as those described below (referring to FIGS. 6-9), for example to analyze audio according to the invention. Management server 1014 may configure or modify such analysis operations, such as by manual input from a human user received via client user interface 1030, or automated or semi-automated operation such as by rules-based or machine learning operation. In this manner, it may be seen that operation of audio analysis may be performed with or without human interaction, interchangeably as appropriate. According to the embodiment, management server 1014 may also present analysis operation results to a user for viewing or interaction, such as to rearrange or modify data, for example to perform manual "cleanup" to remove additional noise or unneeded audio elements after listening to an audio source.

Figure 5:
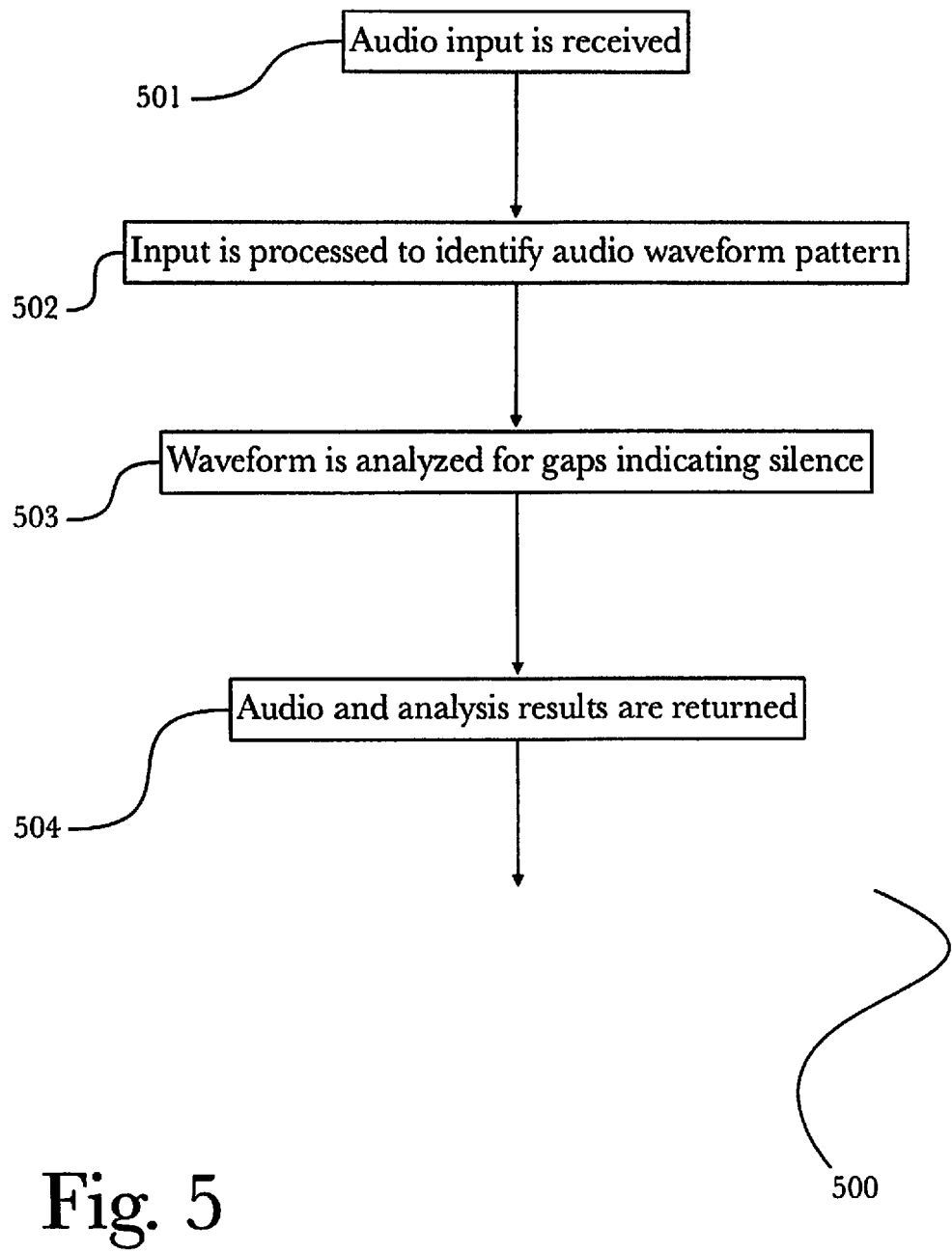
FIG. 5 is a method flow diagram illustrating an exemplary method for language-independent, non-semantic speech analytics according to a preferred embodiment of the invention, illustrating analysis based on silence detection.

FIG. 5 is a method flow diagram illustrating an exemplary method 500 for language-independent, non-semantic speech analytics comprising silence detection, according to a preferred embodiment of the invention. In an initial step 501 an audio signal (such as a call recording or other audio input) may be received, such as by listening to a telephone call or playing a stored audio recording. In a next step 502 the audio may be processed to determine the waveform or audio amplitude ("peaks" in an audio waveform, indicating the presence of an utterance or other noise), and in a next step 503 further processing for silence detection may be performed, to identify gaps or periods of low amplitude (as might indicate pauses in speech). In a final step 504, results of silence detection may be returned such as presenting to a user, storing for future review, or presenting for further analysis (such as according to additional embodiments described below), according to a particular arrangement. It should be appreciated that an audio source may be any appropriate source of audio data such as a live audio stream or stored audio file or recording, and may comprise one or more speakers as well as other audio sources such as background noise or other non-verbal audio, and it should be further appreciated by one having skill in the art that with current audio processing technologies common in the art, it is easy to isolate human speech from background noise, as well as to separate speakers when multiple individuals are present in an audio recording.

Figure 6:
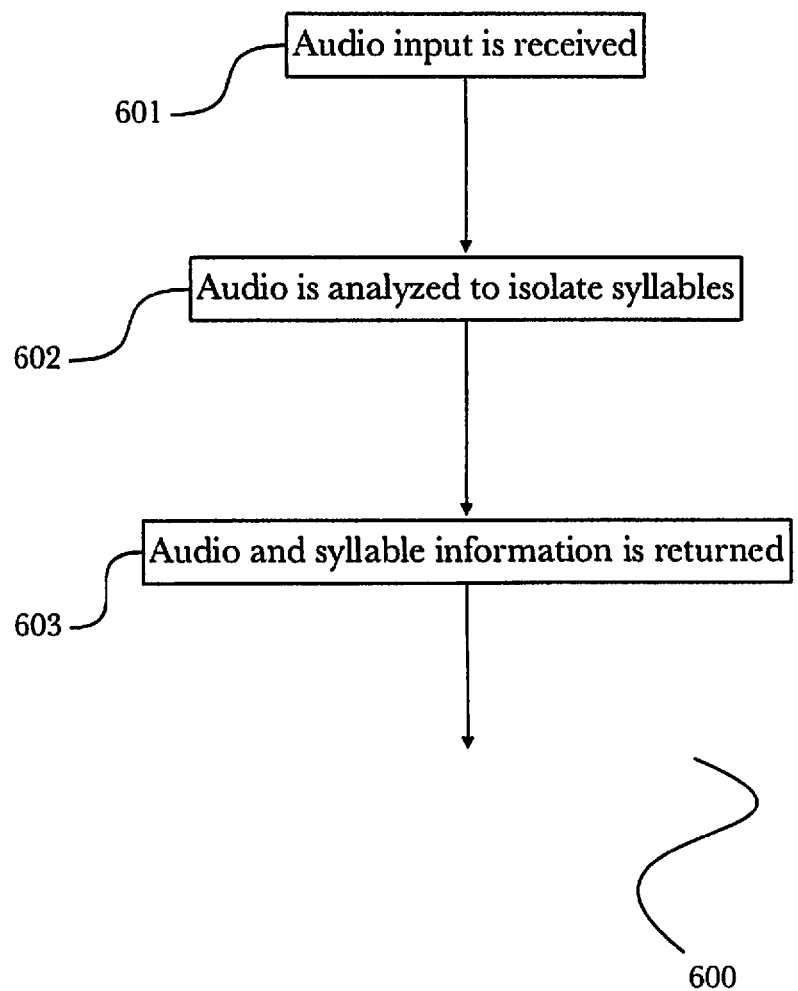
FIG. 6 is a method flow diagram illustrating an exemplary method for analysis based on spoken syllables, according to an embodiment of the invention.

FIG. 6 is a method flow diagram illustrating an exemplary method 600 for language-independent, non-semantic speech analytics comprising syllable identification, according to another embodiment of the invention. According to the embodiment, syllable detection may be utilized to identify speech patterns such as cadence or rhythm, rather than attempting to extract actual linguistic meaning by recognizing the meaning of the syllables themselves. In this manner, speech analysis may reveal speech patterns regardless of the language being spoken or the speaker being heard, by utilizing discrete verbal units (such as syllables) as a basis for analysis. In an initial step 601, an audio input is received (such as from a stored audio recording, a live audio stream, or from the output of a preceding analysis process such as that described above, referring to FIG. 5). In a next step 602, the audio input may be processed for "speech units" such as syllables, for example by utilizing available information regarding pauses in speech (such as might be available from a prior analysis process such as that described above, again referring to FIG. 5), or by analyzing an audio waveform to identify "peaks" or "valleys", as might indicate changes in speech generally correlated with syllabic enunciation. In a next step 603, the results of this syllable identification may be returned, such as presented to a user (for example in an analysis reporting use case), being stored in a database or other medium for future reference, or making the audio and analysis results available for further analysis processes such as those described below.

Figure 7:
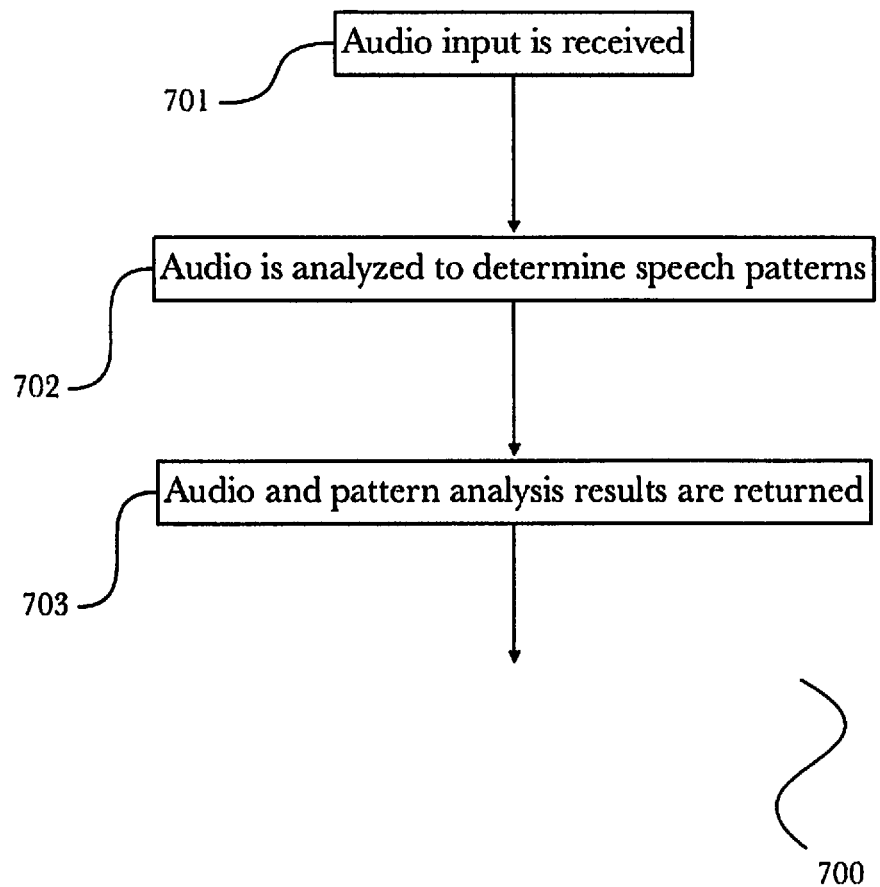
FIG. 7 is a method flow diagram illustrating an exemplary method for analysis based on crosstalk, according to an embodiment of the invention.

FIG. 7 is a method flow diagram illustrating an exemplary method 700 for language-independent, non-semantic speech analytics comprising analysis of speech patterns such as pace or rhythm, such as to identify rushed, hesitant, or otherwise unusually-paced speech, regardless of the content of that speech. In an initial step 701 an audio input is received, such as from a stored audio recording, a live audio stream, or from the output of a prior analysis process such as a syllable identification process as described above (referring to FIG. 6, as might facilitate or expedite speech pattern identification by making syllable information available for rapid analysis). In a next step 702, patterns of syllables or other speech elements may be identified, such as rhythmic repetition or sudden changes, as well as broader information such as general pace or cadence. For example, by utilizing syllable identification information (such as that produced by a syllable identification process according to the invention, referring again to FIG. 6), it becomes possible to identify the rate at which syllables are uttered, and thereby also isolating any patterns in their utterance. Such patterns and cadence analysis may be performed regardless of who the speaker is, and the speaker need not be known for this information to be identified, making such an approach valuable for such purposes as identifying an unknown speaker based on their speech patterns (similar to how individuals often have a unique, personal way of performing other actions such as walking, which may be used to identify them), even if the language spoken is unknown or unintelligible. In a final step 703, the audio as well as analysis results may be returned such as for presentation to a user, storage, or for use as input in further analysis operations.

Figure 8:
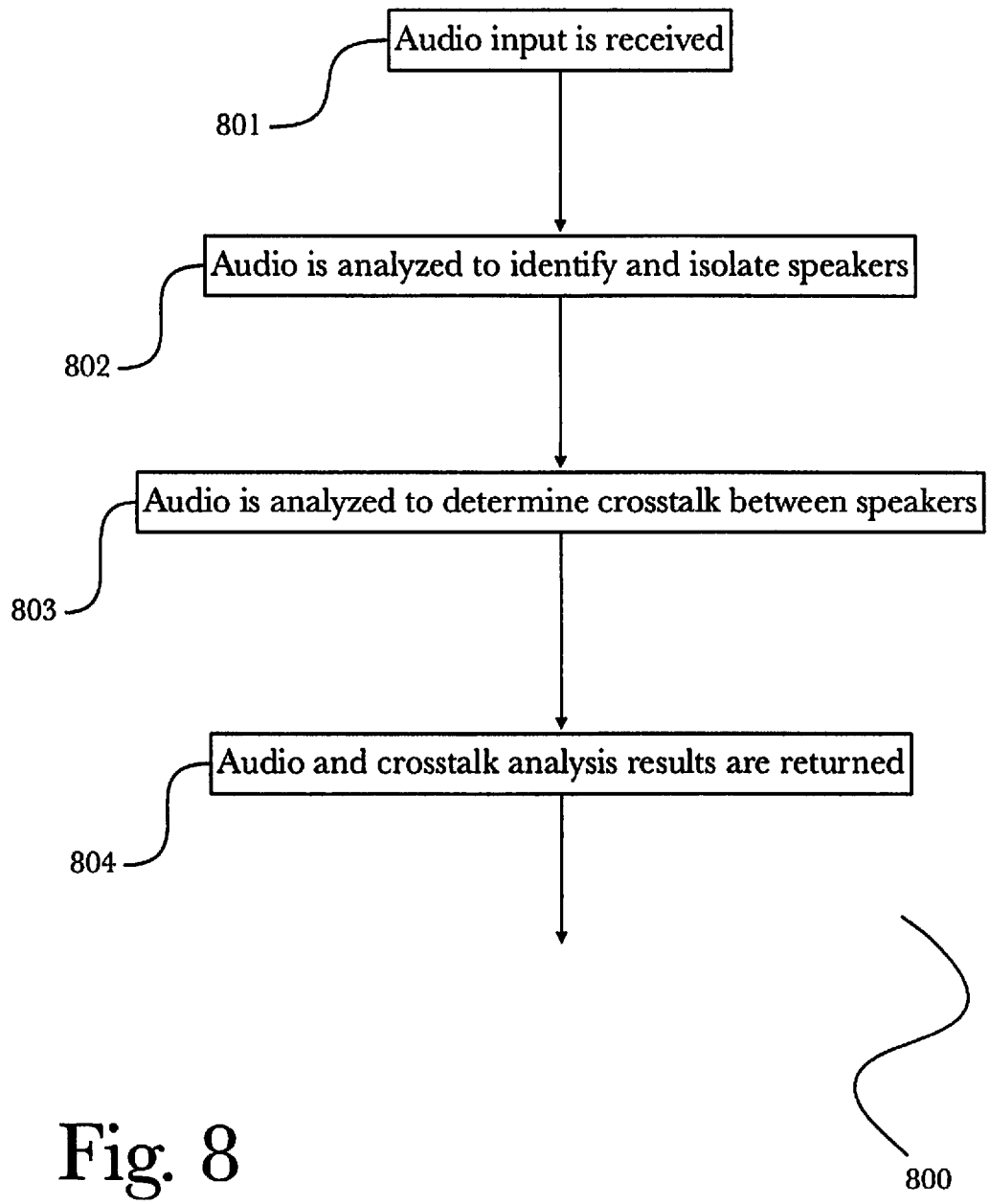
FIG. 8 is a method flow diagram illustrating an exemplary method for analysis based on intonation, according to an embodiment of the invention.

FIG. 8 is a method flow diagram illustrating an exemplary method 800 for language-independent, non-semantic speech analytics comprising the identification of individual speakers within an audio segment, and analyzing the "crosstalk" or occurrence of multiple speakers speaking simultaneously, or "talking over each other". In this manner speech analysis may identify events such as an argument, where multiple speakers may be trying to speak simultaneously, or individual speaker characteristics such as impatience, for example by determining that a particular speaker has an unusually high tendency to speak while another speaker is already speaking, for example. In an initial step 801, an audio input is received such as from a live audio stream, a stored audio recording, or from the output of previously-performed analysis operations such as those described above. In a next step 802, the audio may be analyzed to isolate and separate different speakers, such as based on speech patterns (as may have been identified in a prior analysis operation, referring to FIG. 7), or via any of a variety of alternative means common in the art. In a next step 803, the audio may be further analyzed to identify periods where more than one speaker is speaking, or "crosstalk". This may be done by simply comparing each speaker's utterances and isolating any time overlap, for example. Crosstalk may be useful in determining, for example, the overall nature of a conversation such as determining that there are two speakers and a high amount of crosstalk, as might indicate an argument or other emotionally-charged conversation. Such analysis may reveal details of a conversation's nature without ever knowing the content of the speech or the language being used, enabling more detailed analysis than is possible using existing methods. In a final step 804, the audio and results of crosstalk analysis may be returned, such as for presentation to a user, storage, or for use as input in a further analysis process.

Figure 9:
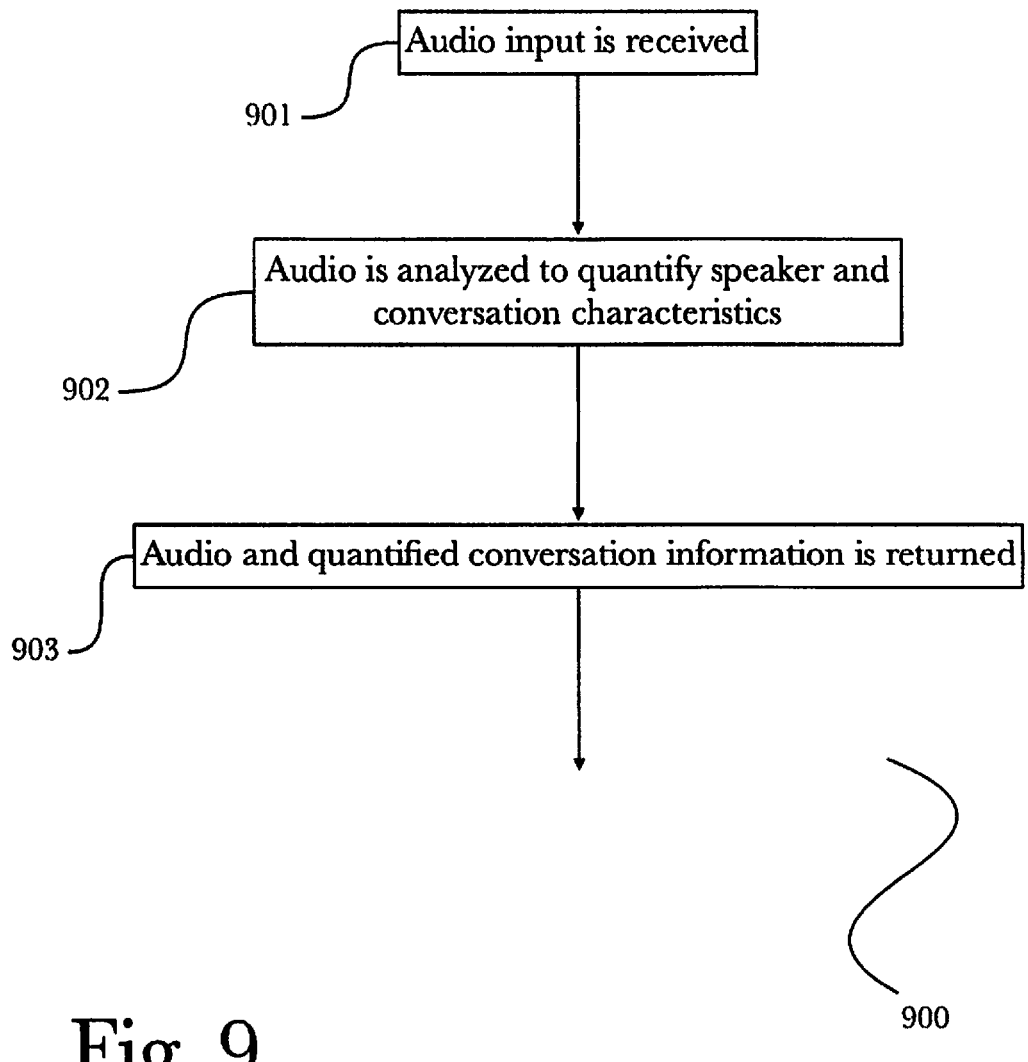
FIG. 9 is a method flow diagram illustrating an exemplary method for analysis based on speech ratio, according to an embodiment of the invention.

FIG. 9 is a method flow diagram illustrating and exemplary method 900 for language-independent, non-semantic speech analytics comprising the analysis and determination of a "talk ratio", representing each speaker's relative role in a conversation by determining characteristics such as (for example) how much of a conversation each speaker contributed, how much of a conversation was crosstalk (as might benefit from the inclusion of analysis results from a prior crosstalk analysis operation as described above, referring to FIG. 8), or other such relationships. In an initial step 801, an audio input is received such as from a live audio stream, a stored audio recording, or form the output of a prior analysis operation such as a crosstalk analysis as described above (referring to FIG. 8). In a next step 802, the audio may be analyzed to obtain quantified details on speaker roles, such as how much of a conversation was spoken by each speaker involved, how much crosstalk took place and by whom, speech patterns or other various analysis that may be linked to specific speakers or groups of speakers. It can be appreciated at this point that the particular analysis described may benefit greatly from the use of analysis results from a variety of previously-performed operations, such as those described above with reference to FIGS. 5-8. Such analysis might reveal further detail into a conversation without regard for the content of the speech itself, such as revealing whether a particular speaker might have been giving a presentation or lecture (where one speaker might dominate a conversation by a large margin, with several other speakers contributing little), or relationships between individual speakers (such as indicating that whenever a particular speaker says something, another speaker usually follows, as might indicate a personal or professional relationship between the two). In a final step 803, the results of this conversation analysis may be returned, such as for presentation to a user, storage for future reference, or for use in further analysis operations.

It should be appreciated that while the methods described herein make reference to a procedural approach, incorporating the results of each analysis process into a later process, such an approach is provided as a means of example to show a preferred method of operation that may achieve ideal results as envisioned by the inventor and to illustrate an approach wherein each successive analysis step incorporates and builds upon previous steps, however such an approach is by no means the only possible procedure and various alternative arrangements may be utilized according to the invention such as individual or standalone analysis operations, or operations taking place in various alternative orders to achieve a desired effect, or other such arrangements and furthermore alternative means of achieving similar analysis results may be utilized according to the invention, either interchangeably with or in addition to the various specific means described.

FIG. 10 is a block diagram illustrating an exemplary system architecture 1000 for non-speech-based speech analytics, according to a preferred embodiment of the invention. As illustrated, media sources 1020 may communicate via the Internet 1001 or other appropriate communications network (such as, but not limited to, telephone or cellular data networks). Media (such as audio information, i.e. recorded or live streaming audio) from sources 1020 may be received by a speech analytics system 1010, such as by passive collection (for example, when a speech analytics system 1010 may be configured to automatically receive data from sources) or by actively requesting or retrieving media.

According to the embodiment, a system for speech analytics 1010 may comprise a media server 1011 that may receive audio media such as voice recordings or live audio streams, and may make such media content available to other components of system 1010 such as an analytics server 1012 that may perform processing operations on media, a database 1013 that may store media and analysis results, or a management server 1014 that may configure or modify analysis operations and may comprise an interactive software component such as a graphical user interface (GUI) for direct user interaction or an application programming interface (API) for indirect interaction through connected means such as a user's device or other software or hardware device or service, such as to present analysis results to a user for viewing or interaction. According to the embodiment, a media server 1011 may receive audio as input from various media sources 1020 such as a mobile phone 1021 or personal computer 1022 communicating via the Internet 1001 or other communications network, or stored audio information such as recordings stored on a database 1013, for example. An analytics server 1012 may perform processing operations on audio such as those described above (referring to FIGS. 6-9), for example to analyze audio according to the invention. A management server 1014 may configure or modify such analysis operations, such as by manual input from a human user, or automated or semi-automated operation such as by rules-based or machine learning operation. In this manner, it may be seen that operation of audio analysis may be performed with or without human interaction, interchangeably as appropriate. According to the embodiment, a management server 1014 may also present analysis operation results to a user for viewing or interaction, such as to rearrange or modify data, for example to perform manual "cleanup" to remove additional noise or unneeded audio elements after listening to an audio source.

The skilled person will be aware of a range of possible modifications of the various embodiments described above. Accordingly, the present invention is defined by the claims and their equivalents.

What is claimed is:

1. A method for language-independent, non-semantic speech analytics, comprising the steps:

receiving, at a media server stored and operating on a network-connected analytics server computer, an audio input from a plurality of network-connected devices;

analyzing, using the analytics server computer, the audio input to determine an audio waveform;

analyzing, using the analytics server computer, the waveform to determine a plurality of periods of silence wherein the plurality of periods of silence are detected by a plurality of valleys in the amplitude of the waveform;

analyzing, using the analytics server computer, the waveform to identify a plurality of units of speech wherein the plurality of units of speech are identified by a plurality of peaks in the amplitude of the waveform;

analyzing, using the analytics server computer, the units of speech within the waveform to determine speech characteristics, including at least a pace of speech during an interaction and a change in pace of speech during an interaction wherein the change in pace is identified by successive stages of analysis utilizing results of previous stages;

analyzing, using the analytics server computer, the waveform to determine a plurality of periods of cross-talk wherein two or more interaction participants are speaking simultaneously wherein a talk ratio is calculated to determine at least a contribution of each of the two or more interaction participants and a quantity of cross talk in the waveform wherein the contribution is computed by determining the relative speaking time of each of the two or more speakers as a fraction of total interaction time;

analyzing, using the analytics server, the waveform to determine an emotional state of a speaker wherein the emotional state of the speaker is determined by the quantity of cross talk in the waveform;

analyzing, using the analytics server, a speech pattern using at least a pace of speech;

identifying an unknown speaker based on the speech pattern wherein identifying the unknown speaker is determined by comparing the speech pattern to a plurality of previously stored speech patterns;

storing the results of waveform analysis for future reference in a database stored and operating on a network-attached computer; and sending the results of the waveform analysis to a client computing device for viewing by a user.

2. The method of claim 1, further comprising the step of analyzing speech characteristics of the waveform to identify and separate multiple speakers.

3. A system for language-independent, non-semantic speech analytics, comprising:

a media server stored and operating on a network-connected analytics server computer;

a database stored and operating on the analytics server computer, that stores the audio input for future reference;

a management server stored and operating on the analytics server computer wherein the media server receives audio input from a plurality of network-connected devices and stores raw audio in the database;

wherein the management server configures operation of the analytics server computer based at least in part on manual input from a human user;

wherein the analytics server computer performs processing operations on the audio input;

wherein the analytics server computer identifies a speech pattern using at least a pace of speech wherein an identification of an unknown speaker is based on the speech pattern;

wherein the database stores the results of the processing operations;

wherein the processing operations comprise at least:

analyzing, via an analytics server computer, the audio input to determine an audio waveform;

analyzing the waveform to determine a plurality of periods of silence wherein the plurality of periods of silence are detected by a plurality of valleys in the amplitude of the waveform;

analyzing the waveform to identify a plurality of units of speech wherein the plurality of units of speech are identified by a plurality of peaks in the amplitude of the waveform;

analyzing the units of speech within the waveform to determine speech characteristics, including at least a pace of speech during an interaction and a change in pace of speech during an interaction wherein the change in pace is identified by successive stages of analysis utilizing results of previous stages;

analyzing the waveform to determine a plurality of periods of cross-talk wherein two or more interaction participants are speaking simultaneously wherein a talk ratio is calculated to determine at least a contribution of each of the two or more interaction participants and a quantity of cross talk in the waveform wherein the contribution is computed by determining the relative speaking time of each of the two or more speakers as a fraction of total interaction time; and analyzing the waveform to determine an emotional state of a speaker wherein the emotional state of the speaker is determined by the quantity of cross talk in the waveform.

* * * * *